Aug. 1, 1967 D. COOPER 3,334,243
SEMICONDUCTOR TIMING NETWORKS
Filed April 30, 1964
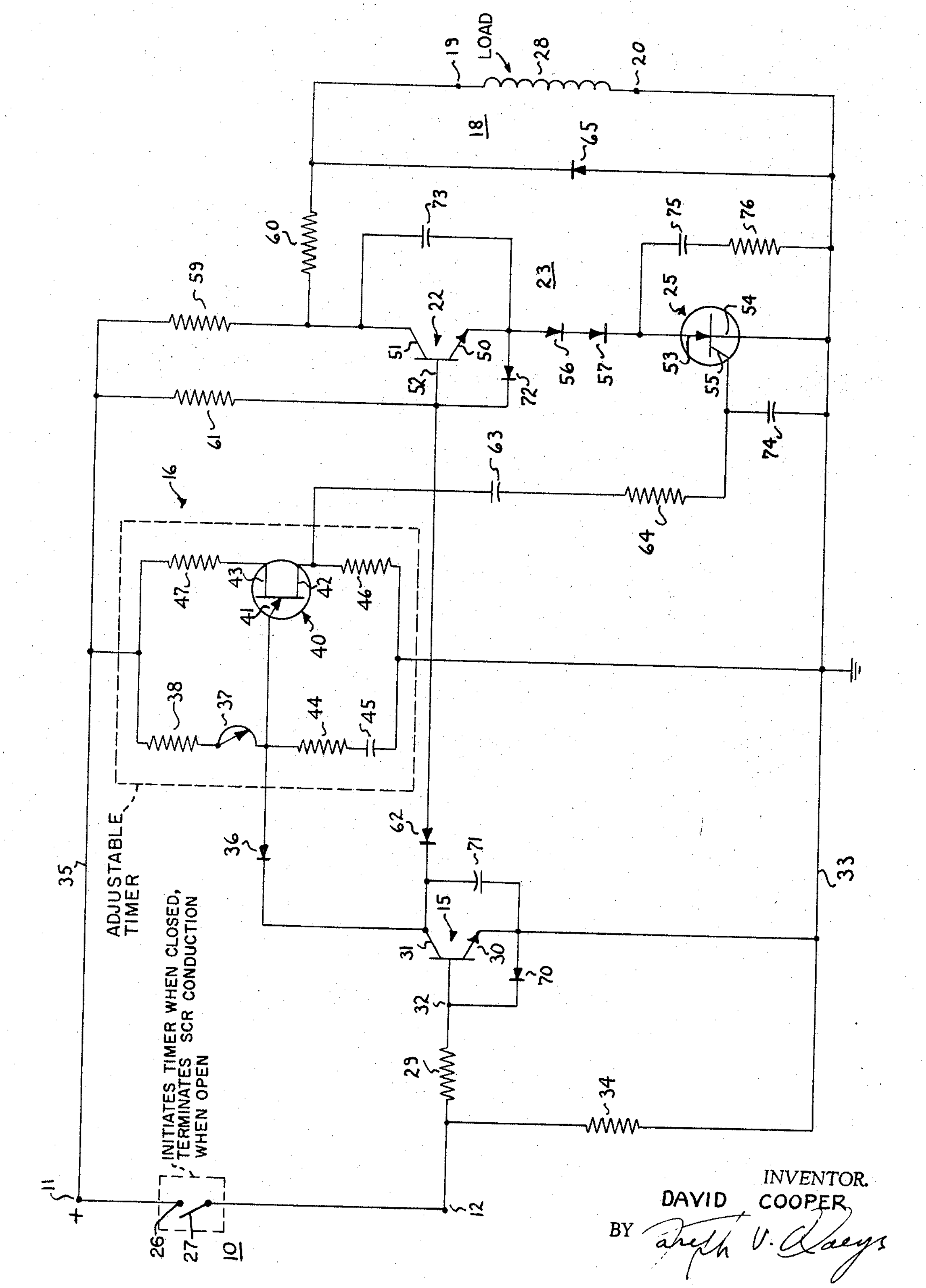
INVENTOR.
DAVID COOPER
BY [signature]
HIS ATTORNEY United States Patent Office 3,334,243

Patented Aug. 1, 1967

3,334,243

SEMICONDUCTOR TIMING NETWORKS

David Cooper, Erie, Pa., assignor to General Electric Company, a corporation of New York Filed Apr. 30, 1964, Ser. No. 363,765
9 Claims. (Cl. 307—88.5)

ABSTRACT OF THE DISCLOSURE

A timing circuit for deenergizing a load (such as a relay coil) a preselected time after the opening of a pair of external contacts and wherein the load is returned to (or maintained in) an energized condition when such contacts are closed. The circuit includes an electric current path, including the series combination of a transistor device and a controlled rectifier, shunting the load. The output of a relaxation oscillator, which relaxation oscillator is rendered operative and the transistor device conductive upon the opening of the contacts (and vice versa on contact closing), is used to render the controlled rectifier conductive. Since the relaxation oscillator output appears a preselected time after the opening of the contacts, the load is shunted and hence deenergized, a similar time after such contact opening. The current path is interrupted when contacts are closed thereby allowing the load to be energized.

This invention relates to timing networks and more particularly to such networks utilizing semiconductor devices.

It is an object of this invention to provide a timing network utilizing semiconductor devices which provides a timing period which is accurate, adjustable and essentially independent of supply voltage and load characteristics.

It is another object of this invention to provide an improved time delay circuit utilizing the highly stable negative resistance characteristics of the semiconductor double base diode and the power switching characteristics of the semiconductor controlled rectifier device.

It is a further object of this invention to provide an improved timing circuit utilizing semiconductor devices which provides power switching as an output and allows for interruption of the timing period at any time with complete restoration of the initial conditions.

Briefly stated, in accordance with one aspect of this invention, the timing network includes a relaxation oscillator circuit providing an output having a predetermined period of oscillations. The network also includes an output means and an electric circuit path shunting the output means which path includes a transistor device and a controlled rectifier device connected in series combination to provide a low impedance path across the output means when both of the devices are conductive. The network further includes an input switching device responsive to the occurrence of an event, such as the opening of a pair of separable contacts, for simultaneously rendering the relaxation oscillator circuit operative and the transistor device conductive. The output of the relaxation oscillator circuit is then utilized to render the controlled rectifier device conductive to complete the shunt path across the output means. Since the output pulse from the relaxation oscillator circuit appears a fixed time after initiation of operation thereof, the shunt path across the output means is completed to de-energize the output a fixed time after occurrence of the event.

The novel features believed characteristic of the invention are set forth with particularity in the appended claims. The invention itself, however, together with further objects and advantages, thereof, may best be understood by reference to the following description taken in connection with the accompanying drawing in which the sole figure thereof is a schematic illustration of a timing network in accordance with one embodiment of the invention.

The timing network illustrated in the drawing has as its principal components input means 10 having terminal means 11 and 12, input switching means, shown as a transistor device 15, a relaxation oscillator circuit 16, output means 18 having terminal means 19 and 20, and a transistor device 22 and a controlled rectifier device 25 connected in series combination across output means 18.

While this invention is subject to a wide range of applications, it is especially suited to provide for de-energization of a load circuit connected to its output means a fixed time after opening of a pair of separable main contacts, such as, for example, the contacts of a master controller, and will be particularly described in that connection. Also, although the invention is illustrated and described with reference to NPN type transistor devices, PNP type devices may, of course, be used with the proper reversal of polarities in a manner well understood by those skilled in the art.

Accordingly, in the drawing, the network is shown with a pair of separable contacts 26 and 27 shown within the unnumbered dash-lined box across input means 10 and a load circuit, shown schematically as a relay winding 28, connected across output means 18. Transistor device 15 is arranged to be conductive when contacts 26 and 27 are closed and nonconductive when the contacts are open. Also, the arrangement of transistor device 15 is such that it causes transistor device 22 to be in a conducting condition opposite thereto. For example, when transistor device 15 is nonconducting, transistor device 22 is rendered conducting and vice versa. At the same time, relaxation oscillator circuit 16 is rendered operative and inoperative, respectively, when transistor device 15 is in a nonconducting and a conducting condition.

The foregoing components are interconnected in the following manner to accomplish these results. Input transistor device 15 includes as emitter electrode 30, a collector electrode 31 and a base electrode 32. Emitter electrode 30 is connected to a common conductor 33 which may be at ground potential. The base electrode 32 is connected through resistance 29 to the input terminal 12 and through a suitable current limiting resistance 34 to common conductor 33. Collector electrode 31 is connected to the positive supply conductor 35 through a blocking diode 36 and a potentiometer 37 and resistance 38 of relaxation oscillator circuit 16.

Relaxation oscillator circuit 16 may be of any suitable type arranged to be controlled by the conductivity condition of transistor device 15. As shown, relaxation oscillator circuit 16 is preferably of the double base diode type wherein a double base diode device, also customarily referred to as a PN unijunction transistor, is adapted to provide a discharge path for a capacitor which is recurrently recharged from the supply. Relaxation oscillator circuits of this type are described in detail on pages 141 and 142 of the General Electric Transistor Manual, 5th edition, copyright 1960, by the General Electric Company.

As illustrated, relaxation oscillator circuit 16 includes double base diode device 40 having an emitter electrode 41, a first base electrode 42 and a second base electrode 43. Emitter electrode 41 is connected through potentiometer 37 and resistance 38 to positive supply conductor 35 and through a resistance 44 to one terminal of a timing capacitance 45. The other terminal of capacitance 45 is connected to the common conductor 33. The first base electrode 42 is connected through a resistance 46 to common conductor 33 while the second base electrode 43 is connected through a resistance 47 to positive supply conductor 35.

Since the emitter-collector circuit of transistor device 15 is connected across the series combination of resistance 44 and capacitance 45, a low impedance shunt path is provided thereacross when transistor device 15 is conducting. For example, when transistor device 15 is in a conducting condition, current from the supply is by-passed through the transistor to prevent capacitance 45 being charged. Conversely, when transistor device 15 is in a nonconducting condition, capacitance 45 is allowed to charge from the supply. Thus, transistor device 15 is operative to control the operation of relaxation oscillator circuit 16.

The timing network also includes output means 18 having a shunt path, generally designated 23, thereacross which path is changed between conductive or nonconductive conditions under the combined control of transistor device 15 and relaxation oscillator circuit 16. This shunt path includes the transistor device 22 having emitter electrode 50, collector electrode 51 and base electrode 52 and the controlled rectifier device 25 having an anode 53, a cathode 54 and a control, or gate, electrode 55.

Transistor 22 has its emitter electrode 50 connected through series connected diodes 56 and 57 and anode-cathode elements 53 and 54, respectively, to the common conductor 33. Diodes 56 and 57 provide the necessary back voltage capability in the network as well as some isolation between transistor device 22 and controlled rectifier 25. The collector electrode 51 of transistor 22 is connected through current limiting resistance 59 to the positive supply conductor 35 and through current limiting resistance 60 to the output terminal 19. Base electrode 52 is connected through current limiting resistance 61 to positive supply conductor 35 and through blocking diode 62 to collector electrode 31 of transistor device 15. The output of relaxation oscillator circuit 16 is coupled from the first base electrode 42 through capacitance 63 and resistance 64 to the control electrode 55 of controlled rectifier 25. A free-wheeling diode 65 is connected across output means 18 to allow a low impedance path to be established for winding 28 when the shunt path is rendered nonconductive.

The timing network so far described has been simplified in order to more clearly and particularly point out the invention itself. As will be understood by those skilled in the art, however, it is desirable that the semiconductor devices be suitably protected from system transients such as surges and the like. Accordingly, the timing network is shown as including resistances, capacitances and diodes to provide such protection in well-known manner. For example, transistor device 15 is protected by diode 70 connected between emitter electrode 30 and base electrode 82 and a capacitance 71 connected between emitter electrode 30 and collector electrode 31. Transistor device 22 is protected by diode 72 and capacitance 73 connected between its respective electrodes in a similar manner. Also, controlled rectifier device 25 is protected by capacitance 74 connected between cathode 54 and control electrode 55 and by the series combination of capacitance 75 and resistance 76 connected between anode 53 and cathode 54. Further, resistance 44 limits the surge of current which flows when capacitance 45 discharges through the emitter electrode 41 to protect double base diode 40 from excessive currents.

In operation, when contacts 26 and 27 are closed, transistor device 15 is forward biased causing relaxation oscillator circuit 16 to be rendered inoperative by preventing capacitance 45 from charging and also, by the interconnection of collector electrode 31 thereof through blocking diode 62 to the base electrode 52, transistor 22 is reverse biased and hence rendered nonconductive. When transistor 22 becomes nonconductive, output means 18 is energized thereby energizing winding 28 connected between output terminal means 19 and 20. At the same time, since transistor 22 is nonconducting, controlled rectifier 25 is rendered nonconducting since the current therethrough is less than its required minimum holding current. Transistor 22, therefore, is controlled by transistor 15 and is operative to assure "turn off" of controlled rectifier 25 wherever contacts 26 and 27 are closed.

When contacts 26 and 27 are opened, input transistor device 15 is suitably reverse biased causing transistor device 22 to be forward biased and rendering relaxation oscillator circuit 16 operative by allowing capacitance 45 to charge up from the supply through resistance 38, potentiometer 37 and resistance 44. Until such time as an output is developed by relaxation oscillator circuit 16, however, controlled rectifier 25 remains nonconducting and winding 28 remains energized since the shunt path across output means 18 is nonconducting. When capacitance 45 charges to the firing potential of double base diode 40, after a time determined by the supply voltage, the value of resistance 38 and capacitance 45, and the setting of potentiometer 37, it discharges through the emitter-first base circuit 41–42 of double base diode 40.

For example, when the peak firing potential of double base diode device 40 is reached and the peak point current flows through resistance 38 and potentiometer 37 into emitter electrode 41, the emitter resistance becomes very low causing capacitance 45 to discharge through the emitter-first base electrode circuit 41–42. The discharge of capacitance 45 is exhibited as a sudden change of emitter potential which provides an output pulse. This output pulse indicates the end of the time delay period and is utilized to fire controlled rectifier device 25. To this end, the output pulse is coupled through capacitance 63 and resistance 64 to control electrode 55 and renders controlled rectifier 25 conductive. Since transistor 22 has previously been provided with forward bias by operation of input transistor 15, the electrical circuit path shunting output means 18 is completed to reduce the excitation of the winding 28 below the drop-out level of its associated relay. Accordingly, the winding 28 is de-energized a fixed time after the opening of the contacts 26 and 27, which time is determined by the period of oscillation of relaxation oscillator circuit 16. This time may be readily adjusted by adjusting potentiometer 37 since the time delay period depends upon the time constant of the R.-C. circuit. Moreover, the novel circuit arrangement makes possible a timing period which is not only adjustable over a wide range but is extremely accurate and essentially independent of supply voltage fluctuations or load characteristics while allowing the load to remain energized or returned to an energized state whenever a pair of contacts, for example, are closed. In addition, the network provides for fail-safe operation in that failure of the power semiconductor devices in a shorted condition operates to de-energize the output.

One particular timing network constructed in accordance with this invention to provide for de-energization of a relay coil a fixed time after opening of a set of external, master controller contacts, utilized the following values of the circuit components which are exemplary only:

| | |
|---|---|
| Transistor **15** | General Electric 2N335A |
| Transistor **22** | General Electric 2N2192A |
| Controlled rectifier **25** | General Electric 2N1930 |
| Double base diode **40** | General Electric 2N1671B |
| Diodes **36, 56, 57, 62, 65, 70** and **72** | General Electric 1N1694 |
| Resistances **29, 34** and **38** ohms | 22K |
| Potentiometer **37** do | 25K |
| Resistance **44** do | 15 |
| Capacitance **45** mfd | 25 |
| Resistances **46** and **47** ohms | 470 |
| Resistances **59** and **60** do | 200 |
| Resistance **61** do | 6.8K |
| Capacitance **63** mfd | 0.1 |
| Resistance **64** ohms | 100 |
| Capacitances **71** and **73** mfd | .033 |
| Capacitances **74** and **75** mfd | .047 |
| Resistance **76** ohms | 6.8 |
| Potential source volts | 28 to 42 |

While only a preferred embodiment of the invention has been shown by way of illustration, many changes and modifications will occur to those skilled in the art. It is, therefore, to be understood that the appended claims are intended to cover all such changes and modifications as fall within the true spirit and scope of the invention.

What I claim as new and desire to secure by Letters Patent of the United States is:

1. A timing network comprising: input and output means; an electrical current path shunting said output means, said current path including a transistor device and a controlled rectifier device in series combination so that said path is completed only when both of said devices are conductive; a relaxation oscillator circuit having a preselected period of oscillation and providing an output a preselected time after initiation of operation; input switching means responsive to an applied signal for simultaneously rendering said relaxation oscillator circuit operative and said transistor device conductive; and means applying the output of said relaxation oscillator circuit to said controlled rectifier device operative to render said controlled rectifier device conductive a fixed time after application of said input signal so that said output means is substantially de-energized.

2. The timing network of claim 1 wherein said input switching means is a transistor device.

3. The timing network of claim 1 wherein said relaxation oscillator circuit is of the double base diode type wherein said double base diode is arranged to provide a discharge path for a timing capacitance which is recurrently recharged.

4. A timing network comprising: output means connected to be energized from a source of potential; an electrical circuit path shunting said output means and connected to be changed between conducting and nonconducting conditions and vice versa, said path including a transistor device and a controlled rectifier device in series combination; a relaxation oscillator circuit having a preselected period of oscillation to provide an output pulse a preselected time after initiation of operation thereof; input switching means connected to be changed between conducting and nonconducting conditions and vice versa; means coupling said input switching means to said transistor device and to said relaxation oscillator circuit to cause said transistor device to change between nonconducting and conducting conditions and said relaxation oscillator circuit to change between inoperative and operative conditions and vice versa when said input switching means is caused to change from its conducting to its nonconducting condition and vice versa; and means for utilizing the output pulse of said relaxation oscillator circuit operative to initiate conduction in said controlled rectifier device.

5. The timing network of claim 4 wherein said input switching means is a transistor device.

6. The timing network of claim 4 wherein said relaxation oscillator circuit is of the double base diode type comprising a double base diode device and a resistance-capacitance timing circuit arranged so that said double base diode device provides a discharge path for said capacitance which is recurrently recharged from said source of potential.

7. A timing network comprising: output means connected to be energized from a source of potential; an electrical circuit path shunting said output means and being connected to be changed between conducting and nonconducting conditions and vice versa, said path including a first transistor device having a base electrode, a collector electrode and an emitter electrode and a controlled rectifier device having an anode, a cathode and a control electrode with said emitter, collector, anode and cathode arranged in series circuit relationship; a relaxation oscillator circuit having a preselected period of oscillation to provide an output pulse a preselected time after initiation of operation; an input transistor device having a base electrode, a collector electrode and an emitter electrode, said collector electrode being connected to said relaxation oscillator circuit and to the base electrode of said first transistor device to cause said relaxation oscillator circuit to change between operative and inoperative conditions and said first transistor device to change between conducting and nonconducting conditions and vice versa when said input transistor device is caused to change conducting conditions; and means applying the output pulse of said relaxation oscillator circuit to the control electrode of said controlled rectifier device to initiate conduction therein.

8. A time delay network comprising: output means connected to be energized from a source of potential; input switching means; an electrical circuit path shunting said output means operative when in a nonconducting state to allow for energization of said output means and when in a conducting state to cause substantial de-energization of said output means, said path including a transistor device having an emitter electrode, a collector electrode and a base electrode in series combination with a controlled rectifier device having an anode, a cathode and a control electrode; first coupling means from said input switching means to said transistor device operative to maintain said transistor device in a conductivity state opposite that of said input switching means; a relaxation circuit including a timing capacitance, a double base diode device having an emitter electrode and first and second base electrodes, and means causing conduction between said emitter electrode and said first base electrode only when said timing capacitance reaches a predetermined voltage to allow discharge of said capacitance therethrough and the development of an output signal from said relaxation oscillator circuit; second coupling means from said input switching means to the emitter electrode of said double base diode device operative to prevent charging of said timing capacitance when said input switching means is in a conducting state and to allow charging of said timing capacitance when said input switching means is in a nonconducting state; and means coupling the output signal of said relaxation oscillator circuit to the control electrode of said controlled rectifier device to initiate conduction therein.

9. The time delay network of claim 8 wherein said input switching means is a transistor device.

References Cited

UNITED STATES PATENTS

| | | | |
|---|---|---|---|
| 3,018,392 | 1/1962 | Jones et al. | 307—88.5 |
| 3,085,165 | 4/1963 | Schaffert et al. | 307—88.5 |

ARTHUR GAUSS, *Primary Examiner.*

JOHN S. HEYMAN, *Examiner.*